United States Patent [19]

Papandreou

[11] Patent Number: 5,536,543
[45] Date of Patent: Jul. 16, 1996

[54] ILLUMINATED SOFT FEEL BUTTON

[75] Inventor: John Papandreou, Patchogue, N.Y.

[73] Assignee: Izumi Corporation, Yaphank, N.Y.

[21] Appl. No.: 435,756

[22] Filed: May 5, 1995

[51] Int. Cl.[6] .......................... F21V 23/04; B29B 17/00
[52] U.S. Cl. .......................... 428/35.7; 200/60; 200/314;
  200/5 D; 264/131; 264/236; 264/344; 264/347
[58] Field of Search ...................... 428/35.7; 200/60,
  200/314, 5 D; 116/279, DIG. 28; 187/395;
  334/7; 264/131, 236, 344, 347

[56] References Cited

U.S. PATENT DOCUMENTS

| | | | |
|---|---|---|---|
| 3,084,062 | 11/1959 | Chleck et al. | 117/33.5 |
| 3,436,242 | 10/1965 | Schaffner | 117/8 |
| 3,456,043 | 7/1969 | Emery | 264/21 |
| 4,603,065 | 7/1986 | Mori et al. | 428/31 |
| 4,864,473 | 9/1989 | Tokarz et al. | 362/84 |
| 4,928,212 | 5/1990 | Benavides | 362/61 |
| 5,116,270 | 5/1992 | Aizawa et al. | 445/24 |
| 5,120,618 | 6/1992 | Mori et al. | 428/690 |
| 5,208,080 | 5/1993 | Gajewski et al. | 428/1 |

*Primary Examiner*—Charles Nold
*Attorney, Agent, or Firm*—Stephen E. Feldman

[57] ABSTRACT

An illuminated plastic lighting of alphanumeric symbols, such as letters, numbers or words, in soft feel buttons is provided, wherein a translucent rigid base portion is covered with a soft opaque plastic. The opaque plastic has the same thickness as a raised protrusion bearing the desired alphanumeric symbol. The opaque plastic coating is applied in a fluid condition to the top level of the alphanumeric symbol, for revealing the alphanumeric symbol through a recess in the opaque elastomeric coating material. A light source is placed at the bottom of the translucent base portion. The soft feel button is specially useful for making lighted buttons and more particularly, for soft feel buttons for automobile dashboards and the like.

7 Claims, 1 Drawing Sheet

ILLUMINATED SOFT FEEL BUTTON

BACKGROUND OF THE INVENTION

The invention relates to an illuminated plastic lighting of raised alphanumeric symbols, such as numbers, letters or words, in soft feel buttons. The buttons include a translucent hard white plastic base, which is covered with a soft opaque elastomeric plastic coating, such as black plastic.

The soft opaque black plastic coating has the same thickness as the raised illuminated alphanumeric symbol. The opaque black plastic is applied in a fluid condition to the level of the alphanumeric symbol, so that the top of the alphanumeric symbol is co-planar with the top of the opaque elastomeric coating.

A light source is placed at the bottom of the translucent plastic base, opposite the protrusion containing the alphanumeric symbol, for illuminating the alphanumeric symbol from below. This combination is specially useful for making lighted buttons and more particularly, a soft feel button for automobile dashboards and the like.

DESCRIPTION OF THE RELATED ART

Various attempts have been made to provide illuminated alphanumeric symbols. However, these attempts are deficient in that they require the use of a separate luminescent substrate layer, such as glow in the dark paint, for fashioning and marking the desired alphanumeric symbol.

For example, U.S. Pat. No. 3,084,062 of Chleck discloses a paint for manufacturing articles with luminous coated surfaces. The paint comprises a phosphorescent powder mixed with a polymeric binder. However, Chleck '062 merely is a luminescent paint which must be painstakingly applied in minute quantities upon the desired alphanumeric symbol.

U.S. Pat. No. 3,436,242 of Schaffner discloses a method for producing luminescent dial markers by arranging on a dial a layer of a luminescent product, covering the luminescent layer with a layer of a translucent hardenable resin to which a fluorescent substance has been added. In Schaffner '242 a translucent, protective cover is applied over a radioactive luminescent paint.

U.S. Pat. No. 3,456,043 of Emery describes a method for making luminous articles such as knobs, dials comprising injection molding a plastic part, covering the first plastic with luminous material and sealing with adhesive. The plastic part may have a second plastic part molded over it. However, in Emery '043, the alphanumeric symbol is provided by filling a cavity recess conforming to the outline shape to be illuminated. Therefore, great care must be taken to hollow out the desired recess cavity, and great care must be taken to fill the recess cavity with the luminescent material.

U.S. Pat. No. 4,603,065 of Mori relates to a decorative part of a car comprising an indicator which permits the transmission of light, a semitransparent part placed behind the first indicator which reflects the light coming from the front and passes the light coming from the rear. A second indicator permits the partial transmission of light and is placed behind the semitransparent part. An illuminant is placed behind the second indicator. However, in Mori '065, the indicator symbols must be separately coated with a luminescent paint, such as indium tin oxide.

U.S. Pat. No. 4,864,473 of Tokarz discloses a lighting element consisting of a thin piece of electrically conductive material which is specially treated with an electroluminescent coating. However, Tokarz '473 requires the separate application of the electroluminescent coating.

U.S. Pat. No. 4,928,212 of Benavides discloses a phosphorescent vehicle part identification accessory comprising an article of molded plastic with a phosphorescent compound. However, in Benvides '212, the indicator article requires a separate coating of a phosphorescent compound upon the indicator itself.

U.S. Pat. No. 5,116,270 of Aizawa relates to a luminous pointer having an electroluminescent element which emits light when an electric field is applied thereto. The pointer body may be made of a plastic sheet coated with a metal. An insulating layer, a transparent electrode base with a transparent electrode and the desiccant film are luminated on the pointer body. Moreover, Aizawa '270 requires that the luminescent layer be covered with a luminescent material.

U.S. Pat. No. 5,120,618 of Mori discloses an electroluminescent panel made from luminous base film, electroconductive film. The luminous base film has a plurality of holes. A base bar is placed into the holes. However, Mori '618 requires the use of a luminous material.

Furthermore, U.S. Pat. No. 5,208,080 of Gajewski discloses a method for producing optically clear luminates comprising semi-rigid sheet material encapsulated with a luminate layer.

None of the prior art references disclose a soft feel button with a lighted alphanumeric symbol, which does not require the application of a separate luminescent material, such as luminous paint, upon the alphanumeric symbol to be illuminated.

OBJECTS OF THE INVENTION

It is therefore an object of the present invention to provide a lighted soft feel button and a manufacturing process thereof, particularly suitable for automobile dashboards.

It is another object of the present invention to provide a lighted button comprising a soft button portion made from such an opaque elastomeric material composition, which ensures sufficient opacity and which has protruding therethrough an illuminated translucent base portion which maintains its structure over wear and tear.

It is yet another object to provide an illuminated alphanumeric symbol within a soft feel button, wherein the illumination is provided by a light source.

It is further object to provide a soft feel button with an illuminated alphanumeric symbol which avoids the need to apply a separate coating of luminescent paint upon the alphanumeric symbol.

It is yet another object of the present invention to overcome the aforesaid disadvantages of the prior art.

SUMMARY OF THE INVENTION

According to the present invention, there is provided an illuminated plastic lighting of alphanumeric symbols in soft feel buttons, wherein the buttons include a translucent white plastic base, with the desired alphanumeric symbol protruding up therefrom. The soft feel button includes a soft opaque cover which covers the translucent base, except for the protruding portion thereof. The top of the alphanumeric symbol is co-planar with the top of the soft opaque plastic coating, so that the opaque plastic cover has the same

3 thickness as the raised number.

The opaque plastic cover material is applied in a fluid condition over the translucent base portion, up to the level of the alphanumeric symbol. A light source is placed at the bottom of the translucent plastic base portion, opposite the protrusion containing the alphanumeric symbol, which base portion is made of a rigid styrene based elastomer such as sumiflex S4802, manufactured by Sumimono Corp. The opaque soft upper portion of the soft feel button is made of a polypropylene based elastomer, such as Sumiflex E 4800, also of Sumimono Corp.

The standard light source, such as a conventional light bulb powered by an automobile's battery, provides light which is transferred through the translucent alphanumeric symbol portion of the rigid translucent base portion, to illuminate the translucent alphanumeric symbol. When ambient light conditions are at a predetermined level of brightness, such as in broad daylight, light source may be inactivated, such as when the lights for a dashboard instrument panel of an automobile are turned off.

The soft feel button is simple in configuration and inexpensive to manufacture, compared to the tedious assembly of prior art lighted buttons requiring the painstaking application of luminescent, glowing paints.

According to the present invention, there is also provided a process for making a soft feel button with a backlit illuminated alphanumeric symbol comprising steps of:

a) selecting a translucent base material having given light transmitting properties;

b) providing a protrusion extending up from the translucent base, wherein the protrusion conforms in shape to a desired alphanumeric symbol;

c) coating the base portion with an opaque, elastomeric polypropylene material;

d) removing excess opaque elastomeric material until the height of the elastomeric material is co-planar with the top of the translucent protrusion extending up from the base portion, to produce the soft feel button; and, e) lying said laminated fabric composition in a temperate atmosphere for a predetermined period of time until the polypropylene portion is substantially polymerized.

BRIEF DESCRIPTION OF THE DRAWINGS

In order to impart full understanding of the manner in which these and other objectives are attained in accordance with the present invention, the invention can best be described hereinafter with reference to the accompanying drawings wherein.

DETAILED DESCRIPTION OF THE DRAWINGS

Figure 1:
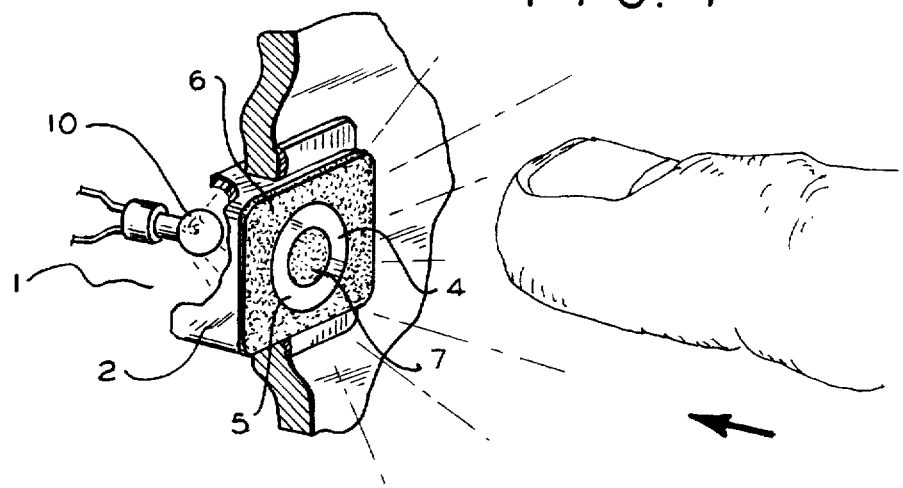
FIG. 1 is a perspective view of the soft feel button of the present invention.

In the following description and in the drawings, the same numerals will refer to the same or similar elements.

4

Figure 2:
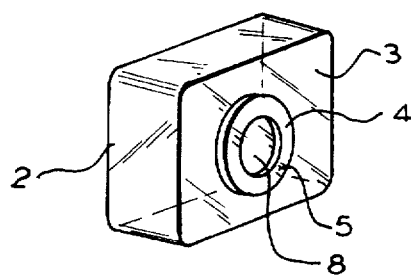
FIG. 2 is a perspective view of the translucent base portion of the soft feel button of the present invention.
Figure 3:
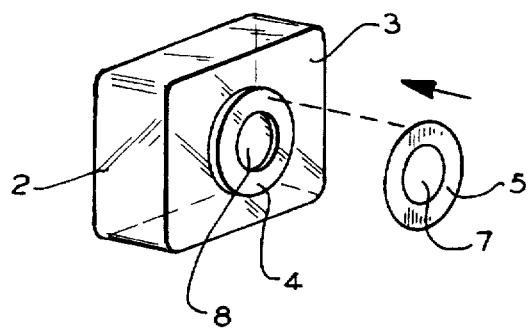
FIG. 3 is a perspective view of the base portion as in FIG. 2, showing a barrier covering an alphanumeric symbol thereon.
Figure 4:
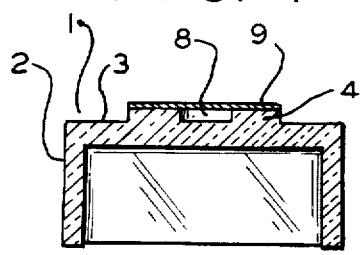
FIG. 4 is a side elevational view in section of the base portion as in FIG. 2.
Figure 5:
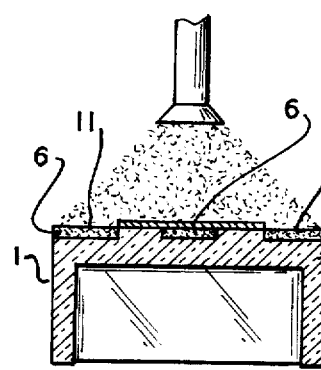
FIG. 5 is a side elevational view of the soft feel button as in FIG. 4, showing the application of opaque material thereon
Figure 6:
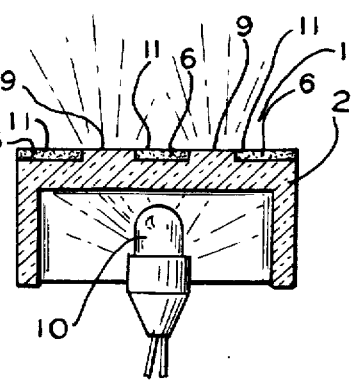
FIG. 6 is a side elevational view in cross section of the soft feel button as in FIG. 1.

According to FIGS. 1–6, the present invention relates to an illuminated plastic lighting of alphanumeric symbols in soft feel buttons, wherein the button includes a translucent hard plastic base with an elevated protrusion conforming to the shape of the desired alpha numeric symbol, wherein further, the base portion, exclusive of the protrusion, is covered with a soft opaque black elastomeric plastic coating material, such as polypropylene.

The opaque black plastic has the same thickness as the raised number. The opaque black plastic is applied in a fluid condition to the top level of protrusion containing the desired alphanumeric symbol. A conventional light source is placed at the bottom of the white plastic, opposite the protrusion, to provide an illuminated, backlit alphanumeric symbol.

Referring to FIGS. 1–6, a soft illuminated button 1, according to the present invention, includes a base portion 2 having protruding up from a top surface 3 thereof a protrusion 4 conforming to the shape of the desired alphanumeric symbol 5, such as a letter, number or word.

Base portion 2 is coated with a polypropylene elastomeric material 6, which dries substantially intact and provides a bond to base portion 2.

Where the alphanumeric symbol 5 includes an inner central portion 7, such as the open middle portion of the letter "O", protrusion 4 includes a recess depression 8, which is filled with elastomeric material 6.

Illuminated button 1, according to the present invention, is made by carrying the steps of the process described hereinafter.

The steps consist of:

a) selecting a translucent base material for base portion 2, wherein the material has given light transmitting properties;

b) providing and forming protrusion 4 extending up from upper surface 3 of translucent base portion 2, wherein protrusion 4 conforms in shape to the shape of desired alphanumeric symbol 5;

c) coating base portion 2 with opaque, elastomeric polypropylene coating material 6;

d) removing excess opaque elastomeric material until the height of elastomeric coating 6 is co-planar with the top 9 of the translucent protrusion 4 extending up from base portion 2, to produce the soft feel button 1; and, e) lying soft feel button 1 in a temperate atmosphere for a predetermined period of time until the polypropylene of base portion 2 is substantially polymerized.

The coating can be carried out by spraying or dripping opaque elastomeric material coating 6 onto base portion 2 for producing soft feel button 1. Soft feel button 1 is then laid in the temperate atmosphere for a predetermined period of time so as to let the polypropylene become polymerized completely.

As a result, soft feel button 1 is produced intact, yet soft, and the elastomeric properties of coating 6 is left substantially intact.

The drying step "e" is continued for a time period determined as a function of the nature of the elastomeric material used.

Once the polypropylene of coating 6 has been polymerized completely, the laminated soft feel button may be trimmed into a desired outside three-dimensional shaping for placement over conventional light source 10, such as a light bulb providing a backlighting of alphanumeric symbol 5, thereby illuminating same without the need to apply a fluorescent or luminescent paint coating thereon.

Thereafter soft feel button 1 is installed into an appropriate location upon an indicator portion of a viewing device, such as an automobile dashboard.

When soft feel button 1 is complete, top surface 9 of translucent protrusion 4 is co-planar with top surface 11 of soft opaque plastic coating 6, so that opaque plastic coating 6 has the same thickness as raised alphanumeric symbol 5.

Although the present invention has been explained hereinafter by way of preferred embodiments thereof, it should be pointed out that any modifications to these preferred embodiments, within the scope of the appended claims, are not deemed to change or alter the nature and scope of the present invention.

I claim:

1. An illuminated soft feel button comprising:

a rigid translucent illuminated plastic base portion, said base portion having a translucent protrusion conforming to a desired shape of a desired alphanumeric symbol extending up from said base portion, a source of light disposed to said translucent base portion, an elastomeric opaque coating covering said rigid translucent base portion up to a level of a top of said protrusion, said protrusion extending co-planar with said opaque coating, and, said protrusion revealing said alphanumeric symbol, said alphanumeric symbol being illuminated by said light source.

2. The illuminated soft feel button as in claim 1 wherein said elastomeric coating is applied in a fluid condition up to said top level of said alphanumeric symbol.

3. The soft feel button as in claim 1 wherein said light source is placed at a bottom of said translucent base portion, opposite said protrusion.

4. A process for making a soft feel illuminated button, comprising steps of:

a) selecting a translucent base material;

b) providing a protrusion extending up from the translucent base, wherein said protrusion conforms in shape to a desired alphanumeric symbol;

c) coating said base portion with an opaque, elastomeric polypropylene material;

d) removing excess opaque elastomeric material until the height of said elastomeric material is co-planar with a top of said translucent protrusion extending up from said base portion, to produce said soft feel button; and, e) lying said soft feel button in a temperate atmosphere for a predetermined period of time until the polypropylene portion is substantially polymerized.

5. The process according to claim 4, wherein said step of coating is carried out by spraying said opaque elastomeric material onto said base portion.

6. The process according to claim 4, wherein said step of coating is carried out by dripping said opaque elastomeric material onto said base portion.

7. A method of manufacturing an illuminated soft feel button comprising the steps of: providing a translucent base portion from which the luminous members are to be formed; forming a protrusion portion on one surface of said base portions, forming the protrusion portion with a predefined shape corresponding to a respective desired alphanumeric symbol; applying an opaque layer on said base portion up to a level corresponding to a top level of said protrusion, said protrusion and said opaque layer being co-planar at said respective top levels, and applying a light source to a side of said translucent base portion opposite said protrusion.

* * * * *